United States Patent [19]

Alsina

[11] 3,859,450

[45] Jan. 7, 1975

[54] PROCESS FOR PREVENTING MELANOSIS IN SHELLFISH

[75] Inventor: Luis Gutierrez Alsina, Valencia, Spain

[73] Assignee: Barreiros Hnos, S.A. Financiera Alcala, Madrid, Spain

[22] Filed: May 8, 1972

[21] Appl. No.: 251,469

[30] Foreign Application Priority Data
May 7, 1971 Spain .................................. 390948
Mar. 24, 1972 Spain .................................. 401129

[52] U.S. Cl. ................ 426/268, 426/263, 426/327, 426/332, 426/376
[51] Int. Cl. ............................................ A22c 29/00
[58] Field of Search ............. 99/158, 160, 225, 195; 426/262, 263, 268, 321, 323, 328, 474, 506, 327, 332, 376

[56] References Cited
UNITED STATES PATENTS

| | | | |
|---|---|---|---|
| 1,927,123 | 9/1933 | Howe | 426/268 |
| 2,309,007 | 1/1943 | Parsons | 99/158 |
| 2,447,417 | 8/1948 | Marshall | 99/158 |
| 2,554,625 | 5/1951 | McFee et al. | 99/160 |
| 3,222,186 | 12/1965 | D'Aquin | 99/158 |
| 3,264,116 | 8/1966 | Gray | 99/158 |
| 3,365,302 | 1/1968 | Vilutis | 426/262 |

FOREIGN PATENTS OR APPLICATIONS

| | | | |
|---|---|---|---|
| 228,438 | 6/1960 | Australia | 99/158 |

OTHER PUBLICATIONS

CRC Handbook of Food Additives, 1968, pp. 163–169.

Primary Examiner—Wilbur L. Bascomb
Assistant Examiner—Curtis C. Ribando
Attorney, Agent, or Firm—Alvin Sinderbrand; Lewis H. Eslinger

[57] ABSTRACT

A process and apparatus for preventing melanosis in shellfish which are to be preserved for freezing are disclosed in which shellfish in a container are covered with an aqueous solution of an innocuous acid, such as citric acid, and the interior of the container is pressurized with carbon dioxide at a predetermined pressure and for a predetermined time. As a result, carbonic anhydride and citric acid penetrate the bodies of the shellfish to preserve the fish and prevent melanosis.

7 Claims, 1 Drawing Figure

PATENTED JAN 7 1975 3,859,450
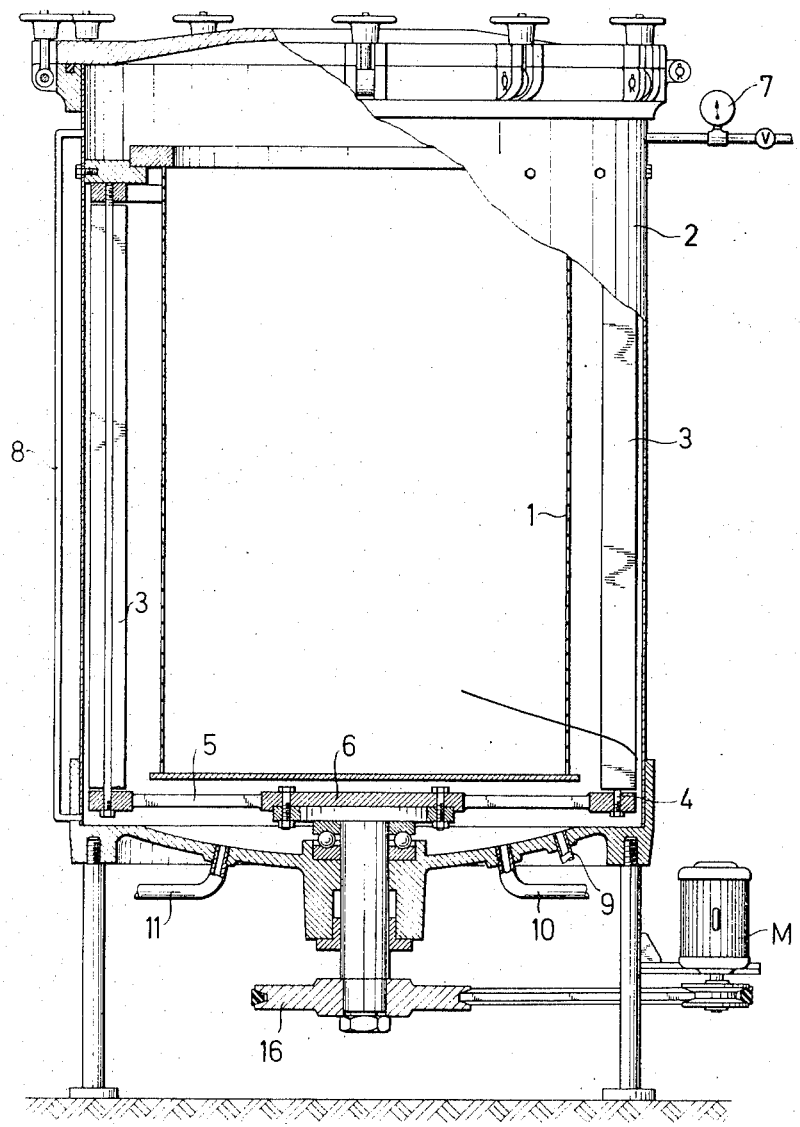

PROCESS FOR PREVENTING MELANOSIS IN SHELLFISH

The present invention relates to the preservation of shellfish, and more particularly, to a new process for preventing the appearance of melanosis in shellfish that are to be preserved by freezing and a device for putting this process into practice.

Up to now, the results obtained with the methods and substances nomally used for preventing the appearance of melanosis (blackening) in shellfish preserved by freezing have, by far, not been as perfect as would be desirable. The two substances normally used for this purpose are boric acid and sodium bisulphite or metabisulphite. With respect to the first, boric acid, its use has several disadvantages, such as affecting the taste of the shellfish so treated, the fact that in order to obtain positive results, it must be used in amounts that make it dangerous because of its toxicity, etc., for which reasons Public Health Departments prohibit its use in most countries. Because of these marked characteristics of toxicity, it becomes mandatory to use it in small amounts, which leads to very uncertain results, and in most cases the appearance of melanosis is not prevented in shellfish preserved with it.

As for the use of sodium bisulphite, while it is authorized by many Public Health Departments, it does not provide the results desired as regards the preservation and sale of the shellfish treated with it. Sodium bisulphate is a product that breaks down very easily once absorbed by the shellfish; it happens that its pH rises rapidly, becoming alkaline and thus prompting a more rapid decomposition of the shellfish itself. it also has the disadvantage of affecting the taste of the shellfish and discoloring it, the latter effect degrades its appearance and results in reduced sales of the same.

Boric acid is used in crystal or powder form for covering the shellfish in layers, an operation that is not carried out with a predetermined amount of boric acid, but rather solely in accordance with the judgement of the person doing the covering, and therefore the final result is that its distribution is not uniform and its intended purpose of preventing melanosis is not achieved perfectly. On the other hand, bisulphites or metabisulphites are normally used dissolved in water and their distribution over the shellfish is uniform, although the absorption of the product is only superficial and, in view of the conditions under which melanosis occurs, these dissolved products have not provided better results than boric acid which, furthermore, has proved to be highly toxic.

It has been found that melanosis occurs in shellfish as a result of an enzymatic reaction and that the cause of this reaction, regardless of the enzymes that occur and of the catalytic agents within the shellfish itself, is an accumulation of oxygen in the enzymes which then produce melanosis. Thus, the fundamental means of preventing the appearance of melanosis is to prevent this oxygen accumulated in the shellfish at death from accelerating the enzymatic reaction.

After extensive biological studies, during which some shellfish were maintained in a perfect state of preservation, in come cases, up to approximately two years, it has been found that the suitable products for the prior treatment of shellfish before freezing for preservation are carbon dioxide and citric acid, the latter in an aqueous solution in specific proportions, used to saturate the shellfish through the injection of the same under pressure in appropriate devices in order to prevent oxygen accumulation.

It takes a longer or shorter time after death for evidence of malanosis to occur in shellfish, depending on their species, where they were caught, etc. If they are subjected to the treatment according to the present invention which is intended to eliminate the oxygen accumulated in them, within certain time limits, the results obtained are perfect and no melanosis appears regardless of how long the shellfish are kept preserved.

The above and other features and advantages of the present invention will be apparent in the following detailed description of an illustrative embodiment thereof which is to be read in connection with the single FIGURE of the accompanying drawing that schematically illustrates, solely as an example, an apparatus for treating shellfish in accordance with the invention Referring to the drawing, shellfish are initially placed in a suitable perforated basket 1, mounted within a stainless steel container 2, provided with a closing system or top 2' capable of withstanding a given pressure, preferably at least 12 $Kgs/cm^2$. In its interior, the container is equipped with a paddle type agitating mechanism 3 whose paddles are mounted in any convenient manner at their upper and lower ends so that the paddles can revolve around basket 1. The lower ends of the paddles are attached at 4 to radial arms 5 which, in turn, are mounted to a central core 6.

Container 2 is provided with a number of conventional accessories for use in liquid pressure vessels, for example, a pressure manometer 7 and a liquid level indicator 8, as well as a decompression and gas entry port, and a water inlet port 10. The central disc or core 6 of the agitator system is coupled, by any appropriate transmission arrangement, to a motor M which is adapted to drive core 6 and thus paddles 3 at a predetermined speed, preferably at 140 r.p.m.

Once the shellfish are placed in the device, there is introduced into container 2 an aqueous solution of an innocuous acidic substance (as distinct from boric acid) that is, for example, citric acid, ascorbic acid, tartaric acid, or mixtures of the same, although preferably, citric acid. This solution is introduced into container 2, before or after the container is closed, from a tank or source thereof through the duct 10 and an associated valve (not shown).

The level of the aqueous solution supplied to the container, with the shellfish already within it, should in no case exceed 80 percent of the height of the container's upper opening, and the aqueous acidic solution should have a pH within the range of 2 to 4. This pH range has been found suitable for obtaining the most perfect results in the preservation of the shellfish, in accordance with this invention.

After the container is filled with shellfish, it is hermetically sealed with top 2'. As mentioned, the aqueous solution may be supplied to the container before or after it is sealed. In either case, sufficient fluid is supplied so that the shellfish are completely submerged in the aqueous acidic solution. Carbon dioxide is then injected under pressure, through port 9 and an associated valve (not shown) to a predetermined pressure, preferably between 3 and 6 $Kgs/cm^2$, depending on the nature, origin and other specific characteristics of the shellfish, and the agitator 6, 3 is put into operation. It is also possible to initially fill container 2 with carbon dioxide after the container is sealed and then supply the aqueous solution through duct 10. In either case the process achieves the same results with the selected conditions maintained for a predetermined length of time that varies as a function of the same shellfish variables mentioned above, after which time the pressure within the device is lowered slowly in any convenient manner, such as for example, through a valve 7' connected to container 2. The possible breaking off of heads or loss of eyes of the shellfish are signs that the pressure to which they have been subjected is near the limit to which that specific kind of shellfish can be subjected, and they show that the said pressure must be watched closely in order to avoid damaging the shellfish to be treated thereafter.

At the conclusion of the decompression operation, which should take from 1 to 2 minutes, the device is opened, the baskets of shellfish dried, and a new load of the same put in place, while more aqueous solution is fed to the container if necessary.

The treatment is repeated in this way with successive loads of shellfish until it is noticed that the aqueous acidic solution is heavily soiled, at which time it is completely renewed.

During the treatment, when the carbon dioxide is injected into the device, it dissolves in the water, so that within the container there exist, at the same time, carbonic anhydride citric acid and of course, carbonic acid. These products penetrate into the bodies of the shellfish owing to the pressure condition obtaining in the device, so that the cephalothorax, the gills, and other parts of the shellfish are completely impregnated with them. It has been found that carbon dioxide is a very good antioxidant and a digester of oxidizable substances, so that at the pressure under which the process is carried out, two things occur: in the first place, the carbonic anhydride eliminates the excess of oxygen that there might still be in the shellfish, and in the second place, the carbonic acid, together with the citric acid, remain in the shellfish in an amount corresponding to its size. When the shellfish treated in this manner, completely impregnated with the above-mentioned products, is frozen, the carbonic acid, frozen owing to its stability at low temperatures, serves as a preserver against possible exudations caused by changes in temperature resulting from refrigerator changes during transport, etc., thus eliminating completely the danger of renewed oxygen accumulation within the shellfish. In the meanwhile, the purpose of the acid substance (citric acid, for example) present in the body of the animal, is to maintain a pH no higher than 6.5 during the period of preservation. Experiments have shown that, preferably, the pH should be kept between 5 and 6 during preservation.

The amount of carbon dioxide normally used for every liter of water is of the order of 12 to 15 grs., while up to 3 kgs of shellfish can be treated with 1 liter of water, with no inconvenience.

The results obtained with the method and the device according to this invention are extremely interesting since the products used leave no toxic residue in the shellfish, nor do they change the color or the taste of the shellfish once they are thawed, while at the same time the flesh of the latter retains its original texture for a much longer time than in the case of preservation treatments used up to now; finally, the appearance of melanosis is prevented completely, even in shellfish with a large head, like the lobster, that can be frozen whole and undergo no change for a very long time.

Subsequently, and for the purpose of increasing the keeping qualities of shellfish treated according to the present invention after thawing, it has been found that the addition of sodium or potassium metabisulphite in amounts as small as 1 to 4 grams of metabisulphite per liter of aqueous solution greatly increases the said after thawing keeping qualities.

While metabisulphite has been used before, by itself, as a preservative, its properties and the quite imperfect absorption of the same by the shellfish make it necessary to use it in very large amounts, with its somewhat toxic nature then beginning to become apparent. If the metabisulphite is used in small amounts, then its preservative effect is nil.

Therefore, its inclusion in the solution according to this invention has proved to be extremely interesting since despite its being used in minute quantities, its effects, in view of its perfect assimilation by the shellfish, which is totally impregnated as a result of the pressure to which it is subjected during treatment, are quite amazing, making it possible to lengthen the keeping time of the shellfish after thawing to a degree which, up to now, was impossible to obtain through the usual methods, and certainly not with the amounts of the order just mentioned of 1 to 4 grams of metabisulphite per certain number of shellfish.

In one specific example of the process of the present invention a container 2, similar to that illustrated in the drawing was filled with approximately 75 Kgs of shrimp from the Caribbean Sea and the container then hermetically sealed. Next, carbon dioxide was supplied to the container until a pressure of 3 Kgs/cm$^2$ was attained, in approximately 10 minutes. Thereafter, an aqueous solution of citric acid and metabisulphite were supplied to the container until the shrimp were covered and a pressure of 5 Kgs/cm$^2$ was attained. The paddles 3 were then agitated for 5 minutes during which period pressure in the chamber dropped to about 4 Kgs/cm$^2$. However, the pressure is preferably maintained at 5Kgs/cm$^2$, by adding more solution or carbon dioxide to the container. After the 5 minute period, the pressure was allowed to decrease to zero in about 3 minutes.

In this example of the present process the aqueous solution contained 6 grams of citric acid per liter of water and 4 grams of metabisulphite per liter of water. The shrimp thus treated were frozen for 6 months without any organoleptic change and no melanosis symptoms. Moreover, upon thawing, the shrimp are safe for consumption for 48 hours if maintained at 5°C.

The solution used in the above described example may be used for treatment of four separate batches of shrimp before being disposed of. Where the process is performed on board ship, after four uses, the solution is stored in a settling tank for later reuse.

Although an illustrative embodiment of the present invention has been described herein with reference to the accompanying drawing, it is to be understood that the invention is not limited to that precise embodiment, and that various changes and modifications may be effected therein by one skilled in the art without departing from the scope of spirit of this invention.

What is claimed is:

1. A process for preventing melanosis in raw shellfish that are to be preserved by freezing, comprising the steps of, placing raw shellfish in a closable container, introducing into said container, before or after said step of placing the shellfish therein, an aqueous solution having a Ph within the range of 2 and 4, and selected from the group consisting of acqueous solutions of citric acid and/or ascorbic acid and/or tartaric acid, sufficient to cover completely the the shellfish in the container, but without filling the container, injecting gaseous carbon dioxide into the interior of said container, after it is closed and before or after said introduction of the aqueous solution thereto, until a pressure of between 3 and 6 kgs/cm$^2$ is reached, thereby to form carbonic acid in said solution; maintaining said predetermined pressure for a predetermined period of time, selected in accordance with the nature, origin and specific characteristics of said shellfish, which period of time is sufficient to completely impregnate the cephalothorax, gills and other parts of the shellfish with said carbonic acid and the acid in said solution, and thereafter reducing the pressure in said container, and removing the shellfish therefrom.

2. The process according to claim 1, including the step of agitating said aqueous solution during said step of maintaining said predetermined pressure in the container.

3. The process according to claim 1 wherein said step of reducing the pressure in said container takes 1 to 3 minutes.

4. The process according to claim 1 including the step of freezing said shellfish after treatment in said container.

5. The process according to claim 1 including the step of adding to the aqueous solution of an acidic substance, before its introduction into the container holding the shellfish, 1 to 4 grams of a metabisulphite for each liter of the said solution.

6. The process according to claim 5, in which the said metabisulphite is sodium metabisulphite.

7. The process according to claim 5, in which said metabisulphite is potassium metabisulphite.

* * * * *